United States Patent [19]
Burns et al.

[11] 3,969,299
[45] July 13, 1976

[54] SIZING OF GLASS FIBERS USING AQUEOUS DISPERSIONS OF FILM-FORMING COPOLYMER OF 90 PERCENT BY WEIGHT VINYL ACETATE WITH QUATERNARY AMMONIUM SALT DERIVATIVE OF ACRYLIC ACID COMONOMER

[75] Inventors: Robert Burns, Bramhall; Alan Edward Johnson, St. Helens, both of England

[73] Assignee: Fibreglass Limited, England

[22] Filed: July 13, 1972

[21] Appl. No.: 271,238

[30] Foreign Application Priority Data
July 15, 1971 United Kingdom............... 33349/71

[52] U.S. Cl. .................... 260/29.6 HN; 428/268; 427/269; 260/29.6 E
[51] Int. Cl.² ................... C08L 33/10; C08L 31/04
[58] Field of Search ............... 260/29.6 H, 29.6 HN; 117/126 GB, 126 GS; 428/268

[56] References Cited
UNITED STATES PATENTS

| | | | |
|---|---|---|---|
| 2,994,619 | 8/1961 | Eilermann .................... | 117/126 GB |
| 3,174,874 | 3/1965 | Fikentsche et al. .......... | 260/29.6 HN |
| 3,245,938 | 4/1966 | Dennis.......................... | 117/126 GB |
| 3,533,768 | 9/1968 | Wong ............................ | 117/126 GB |
| 3,556,754 | 1/1971 | Marsden ..................... | 65/3 |
| 3,637,565 | 1/1972 | Sheetz.......................... | 260/29.6 HN |
| 3,652,326 | 3/1972 | Ward............................ | 117/126 GB |
| 3,694,393 | 9/1972 | Lewis et al................... | 260/29.6 HN |
| 3,795,648 | 3/1974 | Samour........................ | 260/29.6 HN |
| 3,817,898 | 6/1974 | Ward............................ | 260/29.6 NR |

FOREIGN PATENTS OR APPLICATIONS

| | | |
|---|---|---|
| 1,356,819 | 1963 | France |
| 4,019,480 | 1965 | Japan |
| 6,513,671 | 10/1966 | Netherlands |

OTHER PUBLICATIONS
Chemical Abstract vol. 62, 1965, 4220a.
Chemical Abstract vol. 65, 1966, 9179g.
Chemical Abstract vol. 65, 1966, 9180.

*Primary Examiner*—Joseph L. Schofer
*Assistant Examiner*—Peter F. Kulkosky
*Attorney, Agent, or Firm*—Burns, Doane, Swecker & Mathis

[57] ABSTRACT

This invention is concerned with coating Glass Fibers with size and is also concerned with the provision of an improved size composition for use in carrying out the coating step. We provide an aqueous size composition including a polymer dispersion of cationic character, at least 90% of the polymer being formed from units derived from vinyl acetate. The cationic character of the polymer dispersion is formed during preparation of the polymer dispersion by emulsion polymerization.

3 Claims, No Drawings

SIZING OF GLASS FIBERS USING AQUEOUS DISPERSIONS OF FILM-FORMING COPOLYMER OF 90 PERCENT BY WEIGHT VINYL ACETATE WITH QUATERNARY AMMONIUM SALT DERIVATIVE OF ACRYLIC ACID COMONOMER

This invention relates to the coating of glass fibres and more particularly to size compositions for use in such coating, and glass fibres coated with such compositions.

Glass fibres on being formed in a continuous manner, for example at a bushing, must be coated with a size in order to enable the fibres to be handled, and to be used for various purposes. It is desirable to form on the glass a substantially uniform thin size film. Thus it is necessary when using a size in the form of an emulsion, that the emulsion is stable and does not break under conditions used in applying the size to the glass. This can result in an uneven distribution, and the formation of lumps in the film, which can affect the use of the material e.g. in the reinforcement of thermoplastics.

We have found that sizes giving a substantially continuous and uniform thin film on glass fibres can be formed using as the basic film forming material, a polyvinyl acetate polymer or co-polymer dispersion with a cationic character which has been formed by a free radical or redox emulsion polymerisation in the presence of a cationic surfactant or by the use of a cationic monomer to form a co-polymer during emulsion polymerisation in the presence of a non-ionic or cationic surfactant. The polymer dispersion should preferably have a molecular weight in the range 20,000 to 500,000 (e.g. within the range 60,000 to 140,000).

According to the present invention, there is provided an aqueous size composition, for coating glass fibres, comprising as a major film forming agent a polymer dispersion of cationic character wherein at least 90% of the polymer is formed from units derived from vinyl acetate, the cationic character having been conferred during formation of the polymer dispersion by emulsion polymerisation.

By cationic character, we mean that the polymer phase carries a positive charge due to the presence of either
 a. cationic co-monomer units in the polymer chain or units which become cationic upon adjustment of the pH.
 b. a concentration of cationic surfactant at the phase boundary because the water phase used during the polymerisation contained cationic surfactants.
 c. a combination of both (a) and (b).

This cationic character is achieved by carrying out the emulsion polymerisation in the presence of a cationic surfactant. In the case of a co-polymer it can also be obtained in the presence of a non-ionic surfactant if the monomer being used to form the co-polymer with vinyl acetate is cationic.

Typical non-ionic surfactants are:
1. Saturated and unsaturated long chain fatty acid esters with polyolefin oxides e.g. Polyoxyethylene palmitate (G-2079 ex. Atlas Chemical Industries).
2. Polyoxyethylene ethers derived from long chain aliphatic alcohols and alkyl phenols e.g. Polyoxyethylene cetyl ether (Brij 58 ex. Atlas Chemical Industries).
3. Saturated and unsaturated acid monoesters derived from polyhydric alcohols and also polyolefin oxide ethers of the above products, e.g. Sorbitan monolaurate (Arlcel 20 ex. Atlas Chemical Industries). Polyoxyethylene sorbitan monolaurate (TWEEN 20 ex. Atlas Chemical Industries).

Typical cationic surfactants are:
1. Long chain amines and their salts. e.g. Laurylamine (Armeen 12D ex. Armour Hess Chemicals Ltd.)
2. Quaternary ammonium salts of the type

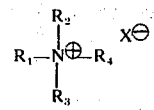

where
 $R_1$ is a long chain alkyl or alkaryl group
 $R_2$, $R_3$, $R_4$ are usually methyl groups but may be other alkyl groups
 $X^-$ is usually a halide but may be another anion e.g. Dodecyl trimethyl ammonium bromide (Morpan D. ex. Glovers (Chemicals) Limited).
 $R_2$, $R_3$, $R_4$ may together form part of a heterocyclic aromatic system or $R_3$ and $R_4$ together may form a heterocyclic ring. e.g.

Tetradecyl pyridinium bromide
(Morpan TPB ex. Glovers (Chemicals) Limited)

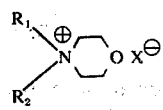

N-Cetyl-N-ethyl morpholinium ethosulphate (G263 ex. Atlas Chemical Industries)

3. Long chain alkyl imidazolines e.g. 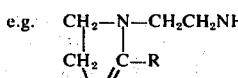 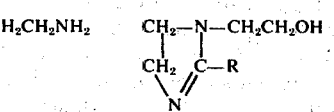

1-amino ethyl  
2-alkylimidazoline  
Casamine M )  
               ex. Thomas Swan & Co. Ltd.  
Casamine MH)

1-hydroxethyl  
2-alkylimidazoline

The cationic surfactant used in the emulsion polymerisation should be chosen so that the dispersion of polymer or co-polymer formed is stable under the conditions of use, and there is no tendency for particles to separate out. We believe that any cationic surfactant can be used for the emulsion polymerisation, but that care should be exercised in selecting such a surfactant to check that it does not result in instability in the size under the conditions of use. The surfactants we have found suitable include quaternary ammonium compounds such as dodecyltrimethylammonium chloride.

We prefer to use as indicated above a polymer or copolymer dispersion having a molecular weight in the range 20,000 to 500,000.

As a co-polymer, we prefer to use a P.V.A. co-polymer formed by reaction of vinyl acetate with a cationic monomer such as 2-dimethylaminoethyl methacrylate. Other cationic monomers include a compound termed PL2/47 (supplied by Glovers (Chemicals) Limited) which has the formula

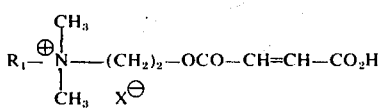

where $R_1$ is

and $X^\ominus$ is a bromide or chloride anion; other suitable cationic monomers being of the formula

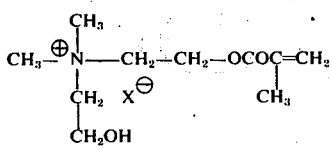

or

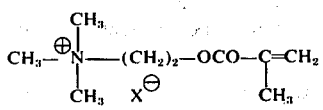

where $X^\ominus$ is a halide or anion of the formula $MeSO_4^-$.

The present invention also provides a method of coating glass fibres in which an aqueous size composition comprising as a major film forming agent a polymer dispersion of cationic character wherein at least 90% of the polymer is formed from units derived from vinyl acetate, the cationic character having been conferred during formation of the polymer dispersion by emulsion polymerisation, is applied to glass fibres.

The invention further provides coated glass fibres which have been coated with an aqueous composition comprising as a major film forming agent a polymer dispersion of cationic character wherein at least 90% of the polymer is formed from units derived from vinyl acetate, the cationic character having been conferred during formation of the polymer dispersion by emulsion polymerisation.

Amongst the silanes that can be used are:
1. Vinyl trialkoxy silanes
   a. Vinyl Triethoxysilane
   b. Vinyl Triacetoxy silane
   c. Vinyl tris (methoxyethoxy) silane
2. Methacrylate functional silanes e.g. Methacryloxypropyltrimethoxysilane
3. Epoxy silanes
   a. Glycidoxypropyltrimethoxysilane
   b. 3,4-epoxycyclohexylethyltrimethoxysilane
4. Amino silanes
   a. γ-amino propyltriethoxysilane
   b. Trimethoxysilylpropylethylene diamine As the polymer or co-polymer dispersion we prefer to use one of the following materials supplied by National Adhesives and Resins, Braunston, Nr. Rugby.

National 102-1207. A vinyl acetate homopolymer of average molecular weight 60,000 stabilised with a non-ionic surfactant and 2% of a quaternary cationion surfactant added during emulsion polymerisation: 44% solids content, particle size 0.11 microns.

National 102-1208. A co-polymer of average molecular weight 140,000 derived from vinyl acetate and 1% of a methacrylate salt monomer stabilised with 1% of a cationic surfactant: 40% solids content, particle size 0.29 microns.

National 102-1209. A co-polymer of average molecular weight 80,000 derived from vinyl acetate and 2% of 2-dimethylaminoethyl methacrylate stabilised with 1% of a cationic surfactant: 45% solids content, particle size 0.26 microns.

National 102-1211. A co-polymer of average molecular weight 70,000 derived from vinyl acetate and 2% of a cationic monomer and stabilised with a wholly non-ionic surfactant system: 47% solids content, particle size 0.19 microns.

National 102-1254 - (Plasticised 102-1207)
National 102-1255 - (Plasticised 102-1208)
National 102-1256 - (Plasticised 102-1209)
National 102-1258 - (Plasticised 102-1209 with half the cationic surfactant present)
National 102-1259 - (Plasticised 102-1258)

All of the plasticised materials referred to by the code numbers National 102-1254/5/6/8/9 have a plasticiser content of 1-40% by weight based on the weight of polymer solids. These plasticised materials were obtained by adding 30% of a plasticiser (polypropylene adipate, molecular weight 2,000) at the end of the emulsion polymerisation. Plasticised materials yield a more flexible coating and a more integrated strand than would be obtained with materials from which the plasticiser was absent.

The sizing composition containing as it does material of a cationic character does not need the presence of additional cationic surfactant material as a lubricant, but in some cases it may be desirable to have a cationic or non-ionic material present to act as a lubricant in the size composition.

Suitable lubricant materials include those already listed as non-ionic and cationic surfactants. The amount added is of the order of 0.05-5% of the size composition and hence it is an added advantage of this invention that in most cases it is possible to dispense with the use of the lubricant, and even when used the quantities required are much less than previously contemplated. A further advantage of these sizes is the low 'size pickup' which is incurred during their use. On the basis of the weight of size lost on ignition, it has been estimated that, for a given weight of glass, only 0.8 to 1.0% of the present size formulations is needed to give an abrasion resistance equivalent to that yielded by 1.6 to 1.8% of more conventional sizes.

The size composition may also contain a plasticiser, which can be the same material as the cationic lubricant or a commonly used plasticiser such as di-butylphthalate or polypropylene adipate or any of a number of polymeric polyester plasticisers. If it is the same material, the extra material required is between 0.05 to 5.0% of the size.

The particle size of the solids in the dispersion should preferably be of the order of 2 microns or less so as to give a film of smooth and uniform appearance. Whilst it is possible to operate with the size composition having a pH as high as 7.0, we prefer to use the sizes in the pH range 3.0–5.0. The pH may be adjusted with hydrochloric acid or any suitable organic acid, for example acetic acid.

The following examples are examples of size compositions in accordance with the present invention.

EXAMPLE 1

10.0% by weight of National 102-1209
0.3% by weight of vinyl tris (methoxyethoxy) silane
0.3% by weight of gamma-amino propyltriethoxysilane
89.4% by weight of water

EXAMPLE 2

10.0% by weight of National 102-1256
0.3% by weight of glycidoxypropyltrimethoxysilane
89.7% by weight of water

EXAMPLE 3

10.0% by weight of National 102-1209
0.3% by weight of methacryloxypropyltrimethoxysilane
4.0% by weight of TWEEN 20 (polyoxyethylene sorbitan monolaurate)
83.7% by weight of water

EXAMPLE 4

10.0% by weight of National 102-1207
4.0% by weight of epoxidised soya bean oil
0.3% by weight of methacryloxypropyltrimethoxysilane
83.7% by weight of water

EXAMPLE 5

10.0% by weight of National 102-1209
0.3% by weight of methacryloxypropyltrimethoxysilane
0.2% by weight of PL 2/47 as cationic lubricant
4.0% by weight of TWEEN 20 (polyoxyethylene sorbitan monolaurate)
85.5% by weight of water

We claim:

1. An aqueous size composition for coating glass fibres comprising water, and a dispersion in said water of a film forming agent consisting essentially of about 5 to 15 percent by weight of a copolymer of at least 90 percent by weight vinyl acetate units wherein the comonomer units of said copolymer are cationic units and are a quaternary ammonium salt derivative of acrylic acid, and about 0.05 to 1 percent by weight of a silane lubricant.

2. An aqueous size composition for coatig glass fibres according to claim 1 wherein said copolymer contains said comonomer units in a concentration of about 1 to 3 percent by weight.

3. An aqueous size composition for coating glass fibres according to claim 1 wherein said cationic comonomer units are derived from 2-dimethylaminoethylmethacrylate.

* * * * *